(12) United States Patent
Tanaka

(10) Patent No.: US 9,902,289 B2
(45) Date of Patent: Feb. 27, 2018

(54) TRANSPORT FACILITY AND AUTOMATED WAREHOUSE

(71) Applicant: Murata Machinery, Ltd., Kyoto-shi, Kyoto (JP)

(72) Inventor: Hiroshi Tanaka, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 386 days.

(21) Appl. No.: 14/758,828

(22) PCT Filed: Dec. 17, 2013

(86) PCT No.: PCT/JP2013/083771
§ 371 (c)(1),
(2) Date: Jul. 1, 2015

(87) PCT Pub. No.: WO2014/125727
PCT Pub. Date: Aug. 21, 2014

(65) Prior Publication Data
US 2015/0336472 A1    Nov. 26, 2015

(30) Foreign Application Priority Data

Feb. 15, 2013 (JP) .................................. 2013-027661

(51) Int. Cl.
*B65G 1/04* (2006.01)
*B60L 13/00* (2006.01)
*B61B 13/04* (2006.01)

(52) U.S. Cl.
CPC ............ *B60L 13/006* (2013.01); *B61B 13/04* (2013.01); *B65G 1/04* (2013.01); *B65G 1/0407* (2013.01)

(58) Field of Classification Search
CPC .......................... B65G 1/0407; H02G 3/0475
See application file for complete search history.

(56) References Cited

U.S. PATENT DOCUMENTS 3,833,140 A * 9/1974 Young .................. B65G 1/0414
294/81.53
5,366,335 A * 11/1994 Tokiwa ................ B65G 1/0407
414/282

(Continued)

FOREIGN PATENT DOCUMENTS

EP    0 536 724 A1    4/1993
EP    1 897 822 A2    3/2008

(Continued)

OTHER PUBLICATIONS

Official Communication issued in corresponding European Patent Application No. 13875005.4, dated Aug. 19, 2016.

(Continued)

*Primary Examiner* — Jonathan Snelting
(74) *Attorney, Agent, or Firm* — Keating & Bennett, LLP

(57) ABSTRACT

A transport facility includes a track, and first and second transport vehicles that travel along the track. In order to supply electric power to the transport vehicles, a flexible first cable guide which includes a front-end attached to the first vehicle and a base-end fixed to the track, is folded back in a U-shape between the base-end and the front-end, is provided on a first side of the track, and supplies electric power to the first vehicle, and a flexible second cable guide which includes a front-end attached to the second vehicle and a base-end fixed to the track, is folded back in a U-shape between the base-end and the front-end, is provided on a second side of the track, and supplies electric power to the second vehicle. Thus, the first and second flexible cable guides are compactly installed while preventing interference therebetween.

8 Claims, 3 Drawing Sheets

(56) References Cited

U.S. PATENT DOCUMENTS

| | | | | |
|---|---|---|---|---|
| 5,927,926 A | * | 7/1999 | Yagi | B65G 1/0407 414/274 |
| 6,156,974 A | * | 12/2000 | Blase | F16G 13/16 174/135 |
| 6,425,238 B1 | | 7/2002 | Blase | |
| 7,693,600 B2 | * | 4/2010 | Tsujimoto | B65G 1/0407 700/213 |

FOREIGN PATENT DOCUMENTS

| | | |
|---|---|---|
| JP | 07-047419 Y2 | 1/1992 |
| JP | 2001-211630 A | 8/2001 |
| JP | 3676186 B2 | 7/2005 |
| JP | 2007-001692 A | 1/2007 |
| WO | 2008/029448 A1 | 3/2008 |

OTHER PUBLICATIONS

Official Communication issued in International Patent Application No. PCT/JP2013/083771, dated Mar. 25, 2014.
Official Communication issued in corresponding European Patent Application No. 13875005.4, dated Jul. 26, 2017.

\* cited by examiner

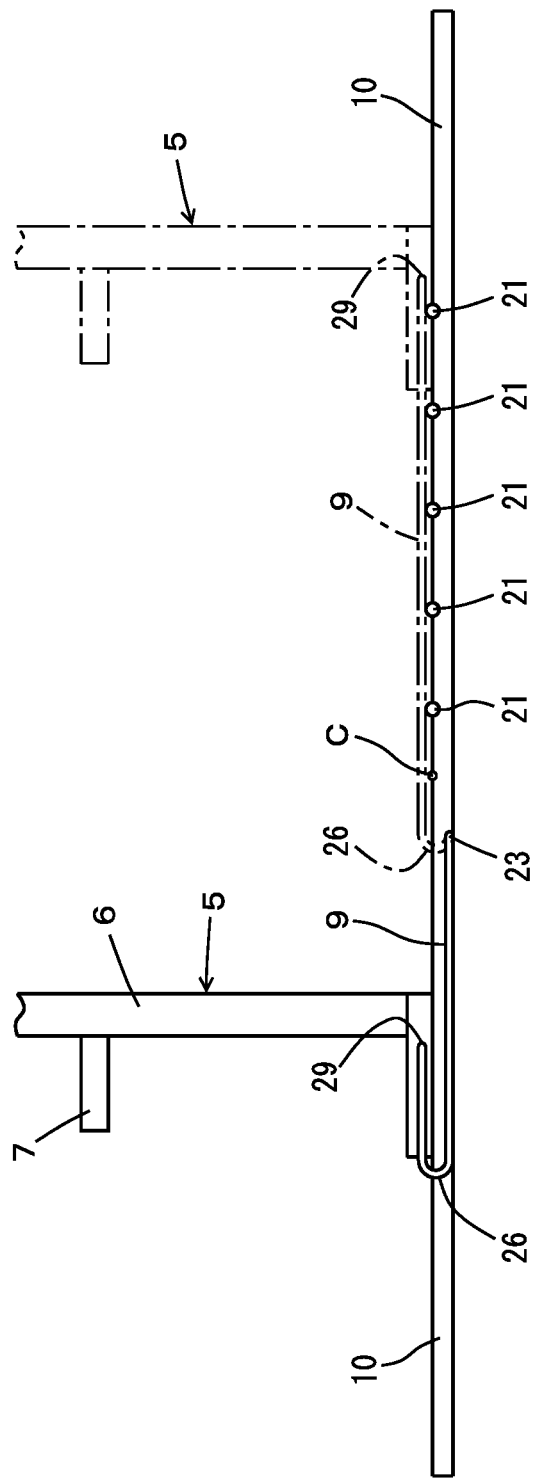

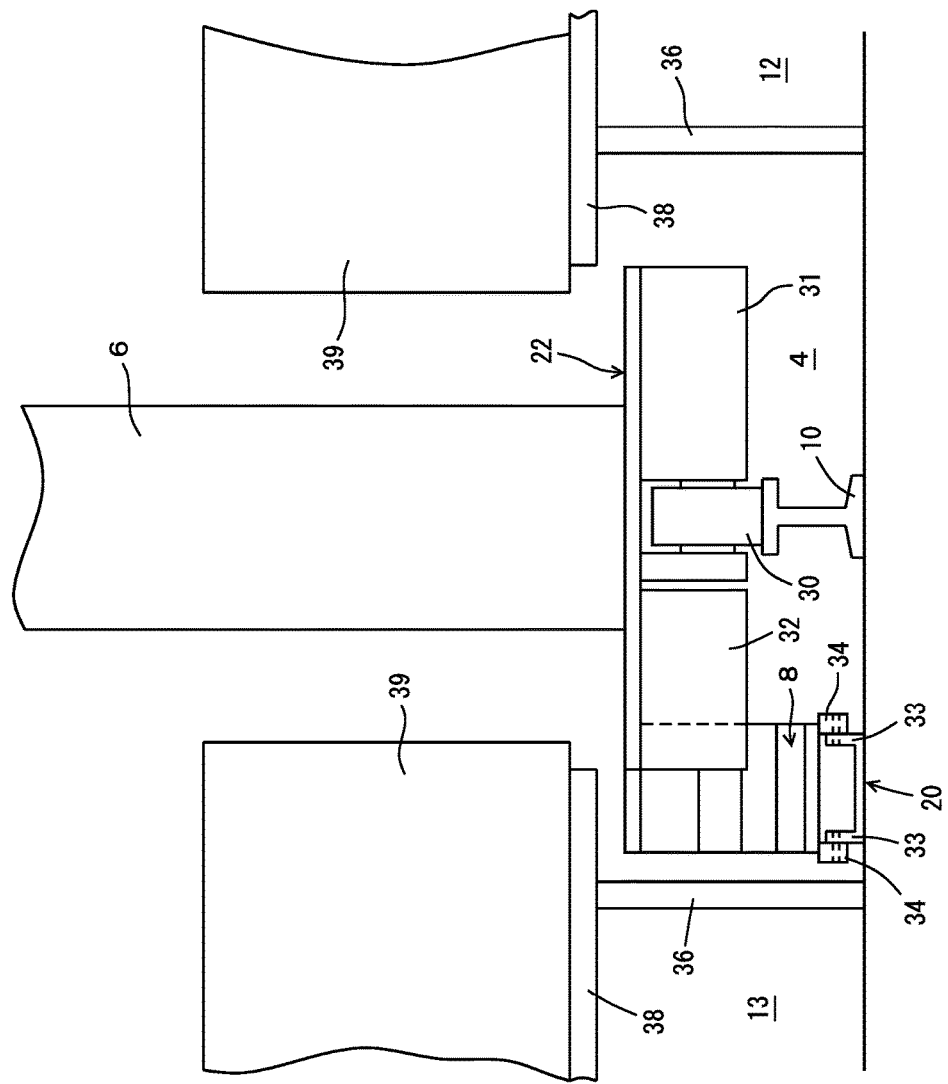

TRANSPORT FACILITY AND AUTOMATED WAREHOUSE

BACKGROUND OF THE INVENTION

1. Field of the Invention

The present invention relates to a transport facility for use in an automated warehouse and the like, and particularly relates to supplying electric power to the transport vehicle.

2. Description of the Related Art

An automated warehouse in which two transport vehicles travel on the same track is known (JP 2007-1692). In such an automated warehouse, racks are divided into a common area to which the two transport vehicles access, and dedicated areas to which only one transport vehicle accesses. The transport vehicles are controlled so as to be prevented from interfering with each other in the common area.

Meanwhile, when electric power is supplied to the transport vehicles via cable guides, interference between the cable guides becomes a problem. On the other hand, a cable guide is a member having a large width, and needs a large space in order to be installed. Therefore, it is necessary to make it possible to compactly install a pair of cable guides while preventing the interference between the cable guides.

SUMMARY OF THE INVENTION

Preferred embodiments of the present invention make it possible to compactly install a pair of cable guides while preventing interference between the cable guides.

A transport facility according to a preferred embodiment of the present invention includes a track; and a first transport vehicle and a second transport vehicle that are configured to travel commonly along the track. The transport facility further includes a flexible first cable guide which includes a front end section attached to the first transport vehicle and a base end section fixed to the track, is folded back in a U-shape between the base end section and the front end section, is arranged on a first side of the track, and supplies electric power to the first transport vehicle; and a flexible second cable guide which includes a front end section attached to the second transport vehicle and a base end section fixed to the track, is folded back in a U-shape between the base end section and the front end section, is arranged on a second side of the track, and supplies electric power to the second transport vehicle.

In various preferred embodiments of the present invention, it is possible to reliably supply electric power to the first transport vehicle and the second transport vehicle via the cable guides without the cable guides interfering with each other. Furthermore, since the first transport vehicle and the second transport vehicle preferably may have the same configuration and the first cable guide and the second cable guide preferably may have the same configuration, manufacturing thereof is easy.

It is preferable that the first cable guide and the second cable guide are arranged such that the front end sections are respectively folded back upward in a U-shape toward the base end sections, preferably a first support member which supports the first cable guide from below is provided in an area that is closer to the second transport vehicle and on the first side of the track when viewed from the center in a traveling direction of the track. Further, a second support member which supports the second cable guide from below is provided in an area that is closer to the first transport vehicle and on the second side of the track when viewed from the center in the traveling direction of the track.

Accordingly, it is possible to prevent the cable guides folded back upward from rubbing against the floor surface of the track or the like which would cause dust and wearing.

It is particularly preferable that each of the first support member and the second support member includes a plurality of brackets that are arranged at a distance and a plurality of rollers, and the rollers are supported by the brackets so as to be rotatable. Accordingly, it is possible to prevent the cable guides from rubbing against the support member and creating dust, and particularly when pairs of left and right rollers are provided to support both the left and right end sections of each cable guide, no force is applied to an electric power feeder accommodated in the central portion of the cable guide.

It is preferable that the base end section of the first cable guide is fixed to a position in a central portion of the track and in the area closer to the first transport vehicle.

And when the first transport vehicle is located in the area closer to the first transport vehicle, the first cable guide is folded back in a U-shape from a state of being in contact with a floor surface of the track, whereas when the first transport vehicle is located in the area closer to the second transport vehicle, the first cable guide is folded back in a U-shape from the vicinity of the base end section and is supported by the first support member in a state of being raised from the floor surface of the track, the base end section of the second cable guide is fixed to a position in the central portion of the track and in the area closer to the second transport vehicle.

Further, when the second transport vehicle is located in the area closer to the second transport vehicle, the second cable guide is folded back in a U-shape from a state of being in contact with the floor surface of the track, whereas when the second transport vehicle is located in the area closer to the first transport vehicle, the second cable guide is folded back in a U-shape from the vicinity of the base end section and is supported by the second support member in the state of being raised from the floor surface of the track.

Accordingly, the transport vehicles are able to travel a relatively long distance with relatively short cable guides. Furthermore, the cable guides that are raised from the floor surface are reliably prevented from rubbing against the floor surface.

Furthermore, it is preferable that electric power feeders are accommodated in central portions of the first cable guide and the second cable guide with respect to a left-right direction, which is a direction that is perpendicular or substantially perpendicular to the traveling direction in a horizontal plane, and a pair of the rollers are provided on both the left and right sides of each bracket in the left-right direction. Accordingly, no stress is applied to the electric power feeders by the rollers.

Furthermore, an automated warehouse according to a preferred embodiment of the present invention includes the above-described transport facility; pillars that are provided relatively close to the track; pillars that are provided on sides opposite to the track; and racks that include rack boards, wherein a pair of the racks are provided on the two sides of the track, the pillars of each rack that are close to the track are provided rearward with respect to a front end of the corresponding rack board that is close to the track, and at least portions of the first cable guide and the second cable guide are arranged in spaces below the respective rack boards, the spaces being created due to the pillars close to the track being provided rearward. Accordingly, it is possible to accommodate the cable guides using the spaces below the rack boards, resulting in space saving.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2 is a side view showing a transport facility and a cable guide.

FIG. 3 is a front view of main portions of the transport facility and racks.

DETAILED DESCRIPTION OF THE PREFERRED EMBODIMENTS

Figure 1:
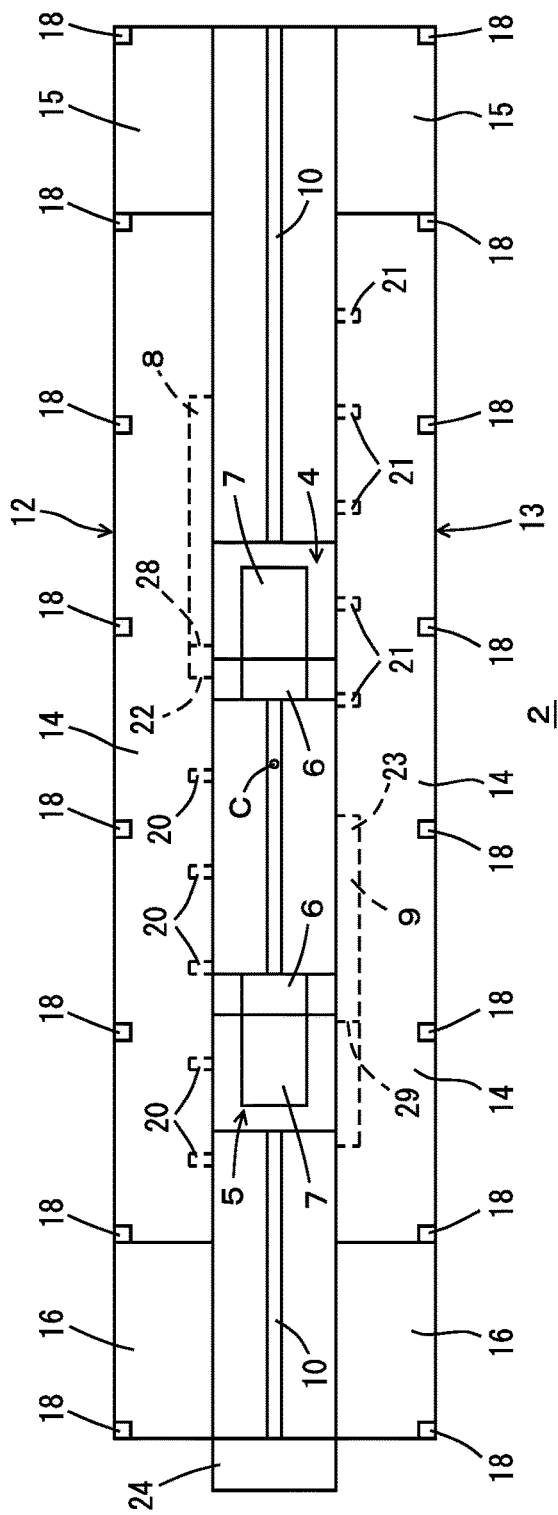
FIG. 1 is a plan view showing an automated warehouse according to a preferred embodiment of the present invention.

The following describes preferred embodiments of the present invention. The scope of the present invention is based on the recitation of the claims, and is intended to be determined in accordance with the understanding of a person skilled in the art with reference to the recitation of this description and well-known techniques in the field of the present invention.

FIGS. 1 to 3 show an automated warehouse 2 and transport vehicles 4 and 5 according to a preferred embodiment of the present invention. The transport vehicles 4 and 5 are, for example, stacker cranes, but may be another type of transport vehicles that do not include a mast 6. The transport vehicles 4 and 5 preferably have the same or substantially the same configuration and each include a transfer device 7 that moves up and down along the mast 6. However, without the transfer device 7 that directly moves up and down a transport vehicle with a lift platform (not shown) on which the transfer device 7 is mounted moves up and down along the mast 6 is usable. A flexible cable guide 8 is attached to the transport vehicle 4 and a flexible cable guide 9 is attached to the transport vehicle 5, and electric power is supplied to the transport vehicles 4 and 5 via the cable guides 8 and 9 from base end sections 22 and 23 thereof on the ground. The reference numerals 28 and 29 denote front end sections of the cable guides 8 and 9 attached to the transport vehicles 4 and 5, respectively.

The transport vehicles 4 and 5 travel on a common traveling rail 10, and C denotes the center of the rail, that is, the center of the traveling rail 10 in the traveling direction. The traveling space in which the transport vehicles 4 and 5 travel is a space that includes the traveling rail 10 and the spaces to the left and right thereof (in the direction that is orthogonal, in the horizontal plane, to the traveling direction of the transport vehicles 4 and 5, that is, the up-down direction of FIG. 1). Furthermore, a pair of, for example, left and right racks 12 and 13 are provided on the left and right of the traveling space. Instead of the pair of left and right racks, one rack may be provided only either on the right or the left. The racks 12 and 13 are divided into a common area 14 that is located in the center of the traveling rail 10 and to which both the transport vehicles 4 and 5 access, a dedicated area 15 that is located on one end side of the traveling rail 10 and to which only the transport vehicle 4 accesses, and a dedicated area 16 that is located on the other end side of the traveling rail 10 and to which only the transport vehicle 5 accesses. The reference numeral 18 denotes pillars for the racks 12 and 13 that are located on the rear ends thereof when viewed from the traveling rail 10. Furthermore, as shown in FIG. 3, pillars 36 on the front sides are provided at rearward positions below rack boards 38, which are the lowermost stages of rack boards having stages in the vertical direction, so as to enable portions of the spaces below the rack boards 38, which are the lowermost stages, to be available for the cable guides 8 and 9. Also, the pillars 18 and 36 support the racks 12 and 13.

The cable guide 8 is arranged laterally on one of the left and right sides of the traveling rail 10 and the cable guide 9 is arranged laterally on the other side of the traveling rail 10, and the base end sections 22 and 23 of the cable guides 8 and 9 are arranged symmetrically with respect to the rail center C. Furthermore, the cable guide 8 is arranged so as to use the space below the lowermost rack board of the rack 12, and the cable guide 9 is arranged so as to use the space below the lowermost rack board of the rack 13. Moreover, a unit constituted by the transport vehicle 4 and the cable guide 8 and a unit constituted by the transport vehicle 5 and the cable guide 9 have the same configuration, and are arranged symmetrically with respect to the rail center C such that the masts 6 face each other. Accordingly, it is only needed to manufacture the uniform transport vehicles 4 and 5 and the uniform cable guides 8 and 9, and to install them in the automated warehouse 2, allowing a reduction in the manufacturing cost. Furthermore, if the masts 6 of the transport vehicles 4 and 5 are arranged close to the rail center C, not the masts 6 but the transfer devices 7 will be located at the ends of the traveling rail 10, leading to an extension of the range of the racks to which the transport vehicles 4 and 5 can access.

The positions of the transport vehicles 4 and 5 and the shapes of the cable guides 8 and 9 are illustrated with reference to FIG. 2, in which the transport vehicle 5 and the cable guide 9 are taken as an example. The transport vehicle 4 and the cable guide 8 have a symmetrical relationship to the components in FIG. 2 with respect to the rail center C. The transport vehicle 5 can travel to the farthest back portion of the dedicated area 16 and the transport vehicle 4 can travel to the farthest back portion of the dedicated area 15. The cable guides 8 and 9 respectively have preferably U-shaped sections 26, which are folded in a U-shape, between the base end sections 22, 23 and the front end sections 28, 29, and the positions of the U-shaped sections 26 are changed due to the travel of the transport vehicles 4 and 5. When the transport vehicle 5 travels from the rail center C toward the dedicated area 16, the cable guide 9 is folded back at its U-shaped section 26 from a state of being in contact with the floor surface of the track, and when the transport vehicle 5 travels from the rail center C toward the dedicated area 15, the cable guide 9 is folded back in the U-shape from the vicinity of the base end section 23 and extends to the front end section 29 in the state of being raised from the floor surface of the track. Since the cable guides 8 and 9 will create dust and also be damaged if the cable guides 8 and 9 are suspended and allowed to rub against the floor surface of the automated warehouse 2, support members 20 for use for the transport vehicle 4 and support members 21 for use for the transport vehicle 5 are provided on the lateral sides of the traveling rail 10 so as to support the lower portions of the cable guides 8 and 9. The support member 20 for use for the transport vehicle 4 are arranged closer to the dedicated area 16 than the rail center C at an appropriate distance, and the support member 21 for use for the transport vehicle 5 are arranged closer to the dedicated area 15 than the rail center C at an appropriate distance.

Stocks in the racks 12 and 13 and the movement of the transport vehicles 4 and 5 are controlled by a controller 24 on the ground side, and the transport vehicles 4 and 5 perform communication with the controller 24 on the ground side via the cable guides 8 and 9, or perform wireless communication such as optical communication with the controller 24 on the ground side. Also, the controller 24 gives an instruction to perform a transportation operation such that interference of the transport vehicles 4 and 5 is prevented.

FIG. 3 shows arrangement of the cable guide 8 and the racks 12 and 13 with reference to the transport vehicle 4, for example; the counterparts preferably are similarly arranged. The reference numeral 30 denotes a drive wheel, the reference numeral 31 denotes a traveling motor, and the reference numeral 32 denotes a lifting motor configured to move the transfer device up and down. Each support member 20 supports a pair of, for example, left and right rollers on two sides 33 of a C-shaped bracket so that the rollers are rotatable, that is, the rollers 34 support the vicinity of the left and right sides of the cable guide 8 from below. Accordingly, the underside of the cable guide 8 does not rub against the floor surface. Note that the support members 21 preferably have the same configuration as that of the support members 20, and are arranged point-symmetrically to the support members 20 with respect to the rail center C. The pairs of rollers 34 support the cable guides 8 and 9 such that no force is applied to electric power feeders accommodated in the central portions of the cable guides.

Packages 39 such as cassettes in which substrates of flat panel displays are accommodated or cassettes in which semiconductor wafers are accommodated are arranged on the rack boards 38, and the rear end pillars 18 are arranged as shown in FIG. 1 and the front side pillars 36 are arranged at positions located rearward with respect to the front ends of the rack boards 38. Therefore, the spaces between the pillars 36 and the traveling rail 10 are available for the cable guides 8 and 9. In FIG. 3, the cable guide 8 is partially accommodated in the space below the rack board 38, but the cable guide 8 may entirely be accommodated therein.

In the present preferred embodiment, one traveling rail 10 preferably is used, but a configuration is also possible in which two traveling rails are provided and the cable guides 8 and 9 are arranged outside the two traveling rails with respect to the left-right direction. Furthermore, in the present preferred embodiment, "transport facility" refers to a facility that preferably includes by the transport vehicles 4 and 5, the cable guides 8 and 9, the support members 20 and 21 including the rollers 34, and spaces in which these constituent components are installed.

According to the present preferred embodiment, the following advantages are achieved:

1) Interference between the cable guides 8 and 9 is prevented, and electric power is reliably supplied to the transport vehicles 4 and 5 in contrast to the case where electric power is supplied via the rail.

2) Space saving is achieved since the spaces below the racks 12 and 13 are available for the cable guides 8 and 9.

3) The manufacturing cost is reduced since the transport vehicles 4 and 5 preferably have the same configuration and the cable guides 8 and 9 preferably have also the same configuration.

4) The support members 20 and 21 prevent the cable guides 8 and 9 from rubbing against the floor surface, and the rollers 34 smoothly move the cable guides 8 and 9. Therefore, the present preferred embodiment is particularly suitable for an automated warehouse in a clean room, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transport facility comprising:
   a track;
   a first transport vehicle and a second transport vehicle that are configured to travel commonly along the track;
   a flexible first cable guide which includes a first front end section attached to the first transport vehicle and a first base end section fixed to the track, is folded back in a U-shape between the first base end section and the first front end section, is arranged on a first side of the track, and supplies electric power to the first transport vehicle; and
   a flexible second cable guide which includes a second front end section attached to the second transport vehicle and a second base end section fixed to the track is folded back in a U-shape between the second base end section and the second front end section, is arranged on a second side of the track, and supplies electric power to the second transport vehicle; wherein
   the first cable guide and the second cable guide are arranged such that the first and second front end sections are respectively folded back upward in a U-shape toward the first and second base end sections;
   a first support member which supports the first cable guide from below is provided in an area that is closer to the second transport vehicle and on the first side of the track when viewed from a center in a traveling direction of the track; and
   a second support member which supports the second cable guide from below is provided in an area that is closer to the first transport vehicle and on the second side of the track when viewed from the center in the traveling direction of the track.

2. The transport facility according to claim 1, wherein each of the first support member and the second support member includes a plurality of brackets that are arranged at a distance and a plurality of rollers, and the rollers are supported by the brackets so as to be rotatable.

3. The transport facility according to claim 2, wherein electric power feeders are accommodated in central portions of the first cable guide and the second cable guide with respect to a left-right direction, which is a direction that is perpendicular or substantially perpendicular to the traveling direction in a horizontal plane, and a pair of the rollers are provided on both the left and right sides of each of the brackets in the left-right direction.

4. The transport facility according to claim 1, wherein
   the first base end section of the first cable guide is fixed to a position in a central portion of the track and in the area closer to the first transport vehicle;
   when the first transport vehicle is located in the area closer to the first transport vehicle, the first cable guide is folded back in a U-shape from a state of being in contact with a floor surface of the track, whereas when the first transport vehicle is located in the area closer to the second transport vehicle, the first cable guide is folded back in a U-shape from a vicinity of the first base end section and is supported by the first support member in a state of being raised from the floor surface of the track;

the second base end section of the second cable guide is fixed to a position in the central portion of the track and in the area closer to the second transport vehicle;

when the second transport vehicle is located in the area closer to the second transport vehicle, the second cable guide is folded back in a U-shape from a state of being in contact with the floor surface of the track, whereas when the second transport vehicle is located in the area closer to the first transport vehicle, the second cable guide is folded back in a U-shape from the vicinity of the second base end section and is supported by the second support member in the state of being raised from the floor surface of the track.

5. An automated warehouse comprising:

the transport facility according to claim 1;

first pillars located closer to the track than the first pillars; and racks including rack boards; wherein a pair of the racks are provided on two sides of the track, the second pillars of each of the racks are provided rearward with respect to a front end of the corresponding rack board tat is close to the track, and at least portions of the first cable guide and the second cable guide are arranged in spaces below the respective rack boards, the spaces being created due to the second pillars being provided rearward.

6. The automated warehouse according to claim 5, wherein each of the first support member and the second support member includes a plurality of brackets that are arranged at a distance and a plurality of rollers, and the rollers are supported by the brackets so as to be rotatable.

7. The automated warehouse according to claim 5, wherein the first base end section of the first cable guide is fixed to a position in a central portion of the track and in the area closer to the first transport vehicle;

when the first transport vehicle is located in the area closer to the first transport vehicle, the first cable guide is folded back in a U-shape from a state of being in contact with a floor surface of the track, whereas when the first transport vehicle is located in the area closer to the second transport vehicle, the first cable guide is folded back in a U-shape from a vicinity of the first base end section and is supported by the first support member in a state of being raised from the floor surface of the track;

the second base end section of the second cable guide is fixed to a position in the central portion of the track and in the area closer to the second transport vehicle;

when the second transport vehicle is located in the area closer to the second transport vehicle, the second cable guide is folded back in a U-shape from a state of being in contact with the floor surface of the track, whereas when the second transport vehicle is located in the area closer to the first transport vehicle, the second cable guide is folded back in a U-shape from the vicinity of the second base end section and is supported by the second support member in the state of being raised from the floor surface of the track.

8. The automated warehouse according to claim 7, wherein electric power feeders are accommodated in central portions of the first cable guide and the second cable guide with respect to a left-right direction, which is a direction that is perpendicular or substantially perpendicular to the traveling direction in a horizontal plane, and a pair of the rollers are provided on both the left and right sides of each of the brackets in the left-right direction.

* * * * *